T..S. PETERMAN.
BOLL BREAKER AND COTTON CLEANER.
APPLICATION FILED MAR. 27, 1916.
1,207,438.
Patented Dec. 5, 1916.
2 SHEETS—SHEET 2.
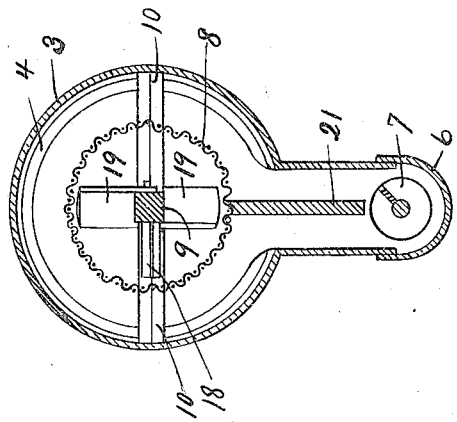
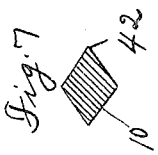
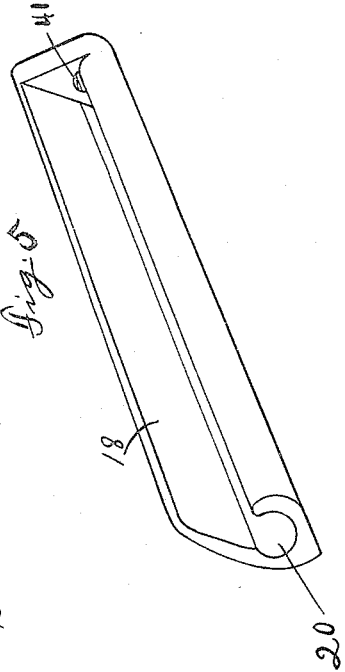
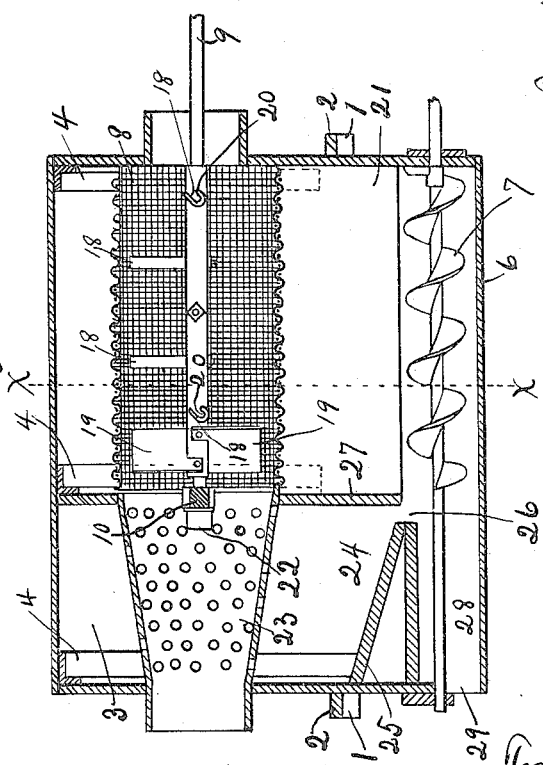
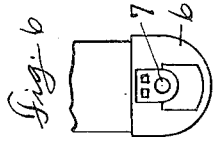

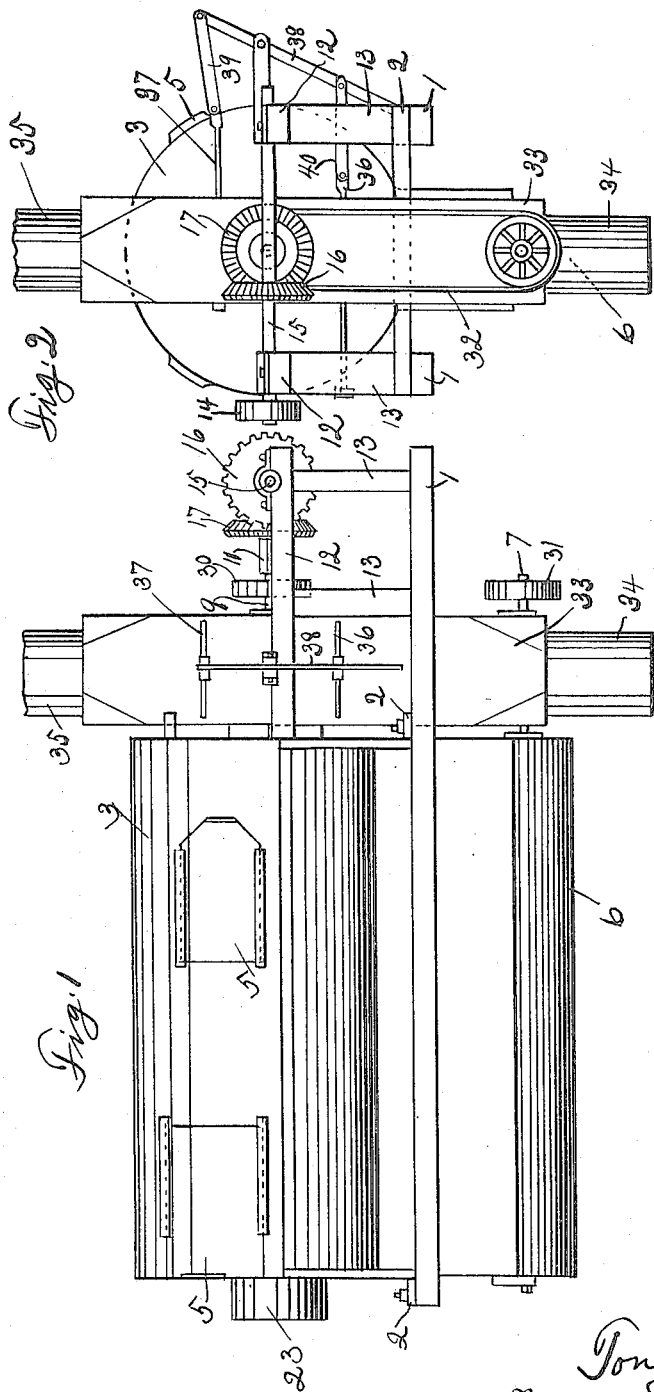

UNITED STATES PATENT OFFICE.

TONEY S. PETERMAN, OF KENNEDALE, TEXAS.

BOLL-BREAKER AND COTTON-CLEANER.

1,207,438.   Specification of Letters Patent.   Patented Dec. 5, 1916.

Application filed March 27, 1916. Serial No. 86,876.

*To all whom it may concern:*

Be it known that I, TONEY S. PETERMAN, a citizen of the United States, residing at Kennedale, in the county of Tarrant and State of Texas, have invented certain new and useful Improvements in Boll-Breakers and Cotton-Cleaners, of which the following is a specification.

My invention relates to improvements for breaking bolls and cleaning seed cotton preparatory to entering the usual cotton feeder to a gin; and the object is to provide an inexpensive and highly efficient apparatus for breaking cotton bolls which have not opened because of immaturity of the bolls. Such bolls are immature for various causes, such as being stung by the boll weevil or other insect, not being mature when frost attacks them, and bolls which the sun cannot reach on account of heavy foliage.

The object of this invention is to provide a breaking mechanism which will break the bolls open and simultaneously clean the cotton of dust, dirt, and small trash, such as comes from broken leaves, the dead squares, grass seed, and other trash that may accumulate in the cotton, and to provide means for accomplishing all these objects without any additional fan or suction devices, and to provide a simple apparatus which is placed between the wagons or seed house and the usual gin feeder.

Other objects and advantages will be fully explained in the following description and the invention will be more particularly pointed out in the claims.

Reference is had to the accompanying drawings which form a part of this application.

Figure 1 is a side elevation of the entire machine. Fig. 2 is an end elevation of the same, showing a driving pulley and showing the valves on the opposite side from that shown in Fig. 1. Fig. 3 is a longitudinal section of the cleaning part of the apparatus. Fig. 4 is a vertical cross-section taken on the line *x—x* of Fig. 3. Fig. 5 is a perspective view of one of the cleaner teeth. Fig. 6 is a detail view, showing the bearing for the conveyer shaft and the dust and dirt and trash discharge opening. Fig. 7 is a cross-section of the bearing bar.

Similar characters of reference are used to indicate the same parts throughout the several views.

The improved apparatus is provided with a supporting frame consisting of side sills 1 and end sills 2. The body 3 may be of sheet metal braced by angle bars 4 and may be provided with doors 5. The body 3 is the breaking and cleaning chamber and a depending portion 6 constitutes a chamber to receive the dirt and trash from which it is removed by a spiral conveyer 7. A cylindrical screen 8 is mounted in chamber 3 and is spaced from the wall of said chamber to provide an escape for dirt, dust, and trash which fall down into the chamber 6. A shaft 9 is journaled in the cross bar 10 and in a bearing 11. The bearing 11 is supported on a frame 12 which is supported on the projecting sills 1 by uprights 13. The shaft 9 is driven by a power pulley 14 which is mounted on shaft 15 and by bevel gear wheels 16 and 17. The cleaner teeth 18 are rigid with the shaft 9 and fan blades 19 are also rigid with the shaft 9. Attention is called to the shape of the teeth 18. They are curved to form a cup or trough 20 and a breaking edge 18. The trash, dust, and dirt will accumulate in the trough 20 and be conveyed by centrifugal force during the operation radially outward in the troughs 20 and thrown through the screen 8 to fall down in the conveyer chamber 6. The fan blades 19 will create a suction in addition to the usual suction in the cotton feeders. The suction and the cleaning go on simultaneously during the operation. A divider board 21 is provided and positioned longitudinally in the main chamber 3 and in the chamber 6 to prevent the dirt, dust, and trash from circulating around the screen 8 and to cause the dirt, dust, and trash to fall down into the chamber 6. An oil cup 22 is attached to the cross-bar 10 for the shaft 9. A funnel-shaped discharge 23 is provided and this discharge receives the cotton from the screening chamber 8. The discharge is perforated to let the dirt, dust, and trash fall down into the dead air space 24. The dirt, dust, and trash will fall down on the incline wall 25 and will slide to the outlet 26. The spiral conveyer 7 stops at the partition 27, and a dirt, dust, and trash discharge chamber 28 is provided at the terminal of the spiral conveyer. The chamber 28 permits the accumulation of trash, dirt, and dust sufficiently to prevent air from coming back into the chamber 24 and into the chamber 6. The dirt, dust, and trash are thus utilized to aid in the operation of the machine by preventing the air from coming in and hindering the operation of the fan blades 19, that is, preventing the successful operation of the fan blades. The continual driving of the spiral conveyer 7 will keep the trash, dirt, and dust moving through the chamber 28 and will cause the same to be discharged through the outlet 29. The spiral conveyer is driven by a pulley 30, and pulley 31 (rigid with conveyer shaft 7, the pulley 30 being rigid with the shaft 9 and driven by that shaft,) and by a belt 32 mounted on pulleys 30 and 31. The cotton may be taken from the wagons or from a seed cotton house, through a feeder chamber 33 which is vertically disposed at the end of the chamber 8. A cylindrical connection 34 is provided at the bottom for connection with the wagons. The upper end of the feeder chamber is provided with a cylindrical connection 35 to make connection with a pipe leading to a seed cotton house. Two valves are provided. One valve 36 is to be open when the cotton is being fed from the wagons and the other valve 37 is closed while the valve 36 is open. The valve 37 is to be open when cotton is being fed from the cotton house, and the valve 36 must be closed while the valve 37 is open. A lever 38 is fulcrumed on the frame 12 and one end is connected to the valve 37 by a link bar 39 and the other end is connected to the valve 36 by a link bar 40.

In operation the cotton is fed into the screen chamber 8 and is agitated by the cleaner fingers 18 which break any unopened bolls and these by their special construction throw the dust, dirt, and small trash through the screen into the chamber 3 and down into the chamber 6 from whence it is carried away by the spiral conveyer. The cleaner and breaker teeth form a part of the suction fan by reason of their width and the angle they make with the shaft. These teeth perform four functions in operation. They agitate the cotton to some extent, create a suction for moving the cotton, break the unbroken bolls, and throw the dust and dirt out through the screen 8.

Various changes may be made in the sizes and proportions of the various parts without departing from my invention. It is apparent that the improved cleaner may be used with any system of feeding or delivering cotton to gins whether by pneumatic conveyers or by traveling conveyers. In order that there may be little obstruction to the passage of cotton out of the casing the cross bearing bar 10 is made diamond shape in cross-section and the edge 42 next to the coming cotton is made as sharp as practical so that the cotton will not hang or be obstructed in its passage.

What I claim, is,—

1. A boll breaking and cotton cleaning apparatus comprising a casing, a cylindrical screen chamber stationary therein, a shaft journaled in said chamber, fan blades rigid with said shaft, combined channeled boll breaking and cleaning blades rigid with said shaft coöperating with said fan blades to draw the cotton from the supply source and to force the same through said chamber, said screen chamber being open at both ends, means for driving said shaft, and means for directing cotton to said screen chamber.

2. A boll breaking and cotton cleaning apparatus comprising a casing, a cylindrical screen chamber open at both ends and stationary therein and spaced from said casing, said casing having an outlet below said screen chamber, a shaft journaled in said casing, boll breaking and cleaning channeled blades rigid with said shaft, means for driving said shaft, and means for directing cotton to said screen chamber, said blades serving to remove the cotton from the supply source and to force the same through said chamber.

3. A boll breaking and cotton cleaning apparatus comprising a casing open at both ends and having an opening in the lower side thereof, a cylindrical screen chamber within said casing open at both ends and spaced from said casing, a shaft journaled in said casing, combined boll breaking and draft making channeled blades rigid with said shaft for removing the cotton from the supply source and forcing the same through said chamber and for cleaning the cotton, and means for directing cotton to said screen chamber.

4. A boll breaking and cotton cleaning apparatus comprising a casing open at both ends and having an opening in the lower side thereof, a cylindrical screen chamber within said casing, rigid therewith and spaced therefrom, a shaft within said screen chamber journaled in said casing, combined boll breaking and draft creating blades rigid with said shaft and having channels therein for throwing dust and trash through said screen chamber, means for driving said shaft, and means for directing cotton into said screen chamber.

5. A boll breaking and cotton cleaning apparatus comprising a casing open at both ends and having an extension at the lower side, a screen chamber within said casing and spaced therefrom and open at both ends, a shaft within said screen chamber and journaled in said casing, channeled boll breaking blades rigid with said shaft for creating a blast through said chamber and for driving the dust through the screen, means for driving said shaft, and means for directing cotton into said screen chamber.

6. A boll breaking and cotton cleaning apparatus comprising a casing open at both ends and having an extension at the lower side, a screen chamber within said casing and spaced therefrom and open at both ends, a shaft within said screen chamber and journaled in said casing, boll breaking blades rigid with said shaft and having channels therein for collecting and throwing dirt and trash through said screen, means in said extension for moving trash and dirt therefrom, means for driving said shaft, and means for directing cotton into said screen chamber.

7. A boll breaking and cleaning apparatus comprising a casing having an inlet and an outlet and an extension at the lower side, a cylindrical screen within said casing and rigid therewith and open at both ends, a divider board extending from said screen down to said extension, a shaft within said screen and journaled in said casing, means in said screen actuated by said shaft for creating a draft and for cleaning cotton, means for driving said shaft, and means for directing cotton into said screen.

8. A boll breaking and cotton cleaning apparatus comprising a casing having inlet and outlet openings and an extension at the lower side, a screen chamber rigid within said casing and rigid therewith and spaced therefrom, a revolving shaft within said screen chamber and journaled in said casing, channeled blades mounted on and actuated by said shaft for creating a draft and for breaking bolls and throwing the dirt and trash out of said screen chamber, and means in said extension for moving the dirt and trash out of said extension.

9. A boll breaking and cotton cleaning apparatus comprising a casing having inlet and outlet openings and extension at the lower side thereof, a vertical partition dividing said casing down to said extension, forming an operating compartment and a discharge compartment, means in said operating compartment for creating a draft, and for breaking bolls and separating the dirt and dust and trash from the cotton, means in said discharge compartment for directing the cotton out of said casing and for further separation of dirt and dust therefrom, means for directing the dirt and dust into said extension, and means in said extension for forcing dust and dirt and trash out of said casing.

In testimony whereof, I set my hand this 14th day of February, 1916.

TONEY S. PETERMAN.

Copies of this patent may be obtained for five cents each, by addressing the "Commissioner of Patents, Washington, D. C."